US006186446B1

(12) United States Patent
Tilley et al.

(10) Patent No.: US 6,186,446 B1
(45) Date of Patent: Feb. 13, 2001

(54) SOLAR ARRAY CONTROL FOR ELECTRIC PROPULSION SYSTEM

(75) Inventors: Scott W. Tilley, Los Altos; Walter Gelon, Redwood City, both of CA (US)

(73) Assignee: Space Systems/Loral, Inc., Palo Alto, CA (US)

(*) Notice: Under 35 U.S.C. 154(b), the term of this patent shall be extended for 0 days.

(21) Appl. No.: 09/328,091

(22) Filed: Jun. 8, 1999

(51) Int. Cl.[7] .................................................. B64G 1/10

(52) U.S. Cl. ...................... 244/158 R; 244/164; 244/172

(58) Field of Search ............................... 244/158 R, 164, 244/172, 168, 169; 701/13

(56) References Cited

U.S. PATENT DOCUMENTS

| 5,528,502 | * | 6/1996 | Wertz | 244/158 R |
| 5,595,360 | * | 1/1997 | Spitzer et al. | 244/158 R |
| 5,716,029 | * | 2/1998 | Spitzer et al. | 244/158 R |
| 5,992,799 | * | 11/1999 | Gamble et al. | 244/158 R |

* cited by examiner

Primary Examiner—J. Woodrow Eldred
(74) Attorney, Agent, or Firm—Perman & Green, LLP

(57) ABSTRACT

In an electric propulsion system used for transferring a satellite to its operational orbit, a solar array adjustment system is controlled to compensate on a continuous basis for the attitude gyrations required by electric thrust vector optimization. The solar array control operates to maintain the solar array in a perpendicular orientation to the sun vector for optimum power generation.

15 Claims, 4 Drawing Sheets

SOLAR ARRAY CONTROL FOR ELECTRIC PROPULSION SYSTEM

BACKGROUND OF THE INVENTION

Electric propulsion systems (EPS) are used to supplement chemical propulsion in orbital and attitude control of satellites. Although generating low thrust, the EPS is efficient and useful for certain applications, such as attitude and station-keeping control. The task in this particular case is orbit adjustment from insertion to operating orbit through a series of transition orbits. The use of EPS for this purpose will reduce the operation of the chemical thrusters with a savings in mass. This allows the chemical thruster system to be used for other maneuvers or allows a reduction in fuel. The mass savings could provide space for additional payload or could be used to extend the on orbit fuel lifetime of the satellite.

The use of electric propulsion to obtain final orbit is described in some detail in U.S. Pat. No. 5,716,029, which issued to Spitzer, et al. In the system described in Spitzer, et al, a satellite is transferred from its injected orbit into a supersynchronous intermediate orbit by its chemical propulsion system. A Xenon ion propulsion system is used to move the satellite into its operational orbit from the intermediate orbit. The EPS applies a thrust which is constant in both amplitude and direction. In the Spitzer, et al system, therefore, the attitude of the satellite remains fixed during the orbit transition process. This approach tends to sacrifice thrust efficiency for maintenance of maximum solar power.

It is a purpose of this invention to provide a electric propulsion system which is controlled to optimize thrust efficiency.

The EPS provides a low amplitude thrust, but requires a large amount of electrical power. This power is supplied by the onboard solar energy generating system which may typically provides more than 15 kw of power. The EPS may use more than one half of the available solar power. Although the EPS power drain in this particular application will precede the full operation of the satellite payload, maximum solar power generation is desirable during the orbital transfer, especially when considering power for buss electronics, heaters, battery charge power, and similar power drains. This requires that the solar array be oriented as near to perpendicular to the sun at all times as can be achieved.

The use of the EPS for the described purpose sacrifices transfer orbit duration for reduction of mass. An orbit transfer process, that can be accomplished by chemical propulsion in a week's time, becomes a three month journey with EPS. It is therefore critical that efficient use of the EPS be maintained at all times, otherwise the transfer from a transitional orbit to operational orbit could be extended for a considerable period.

The use of a constant magnitude thrust vector in a fixed direction, in accordance with Spitzer, may simplify control, but it requires continuous monitoring by ground control. Ground intervention is required to redirect the thrust vector when efficiency becomes unacceptable, hence the preoccupation of Spitzer with a 24 hour orbit.

It is a purpose of this invention to provide a control system which prioritizes for optimum thrust vector direction at all times while allowing for orientation of the solar array for maximum power generation.

SUMMARY OF THE INVENTION

A system is constructed for controlling an electric propulsion system used to move a satellite from an intermediate orbit to an operational orbit. The EPS is operated on a continuous basis at a near constant thrust while the direction of the thrust vector is varied for maximum orbital adjustment. The attitude of the satellite is constrained to keep the sun vector in the XZ plane while the EPS thrusters are positioned to exert a force that is perpendicular to the axis of rotation of the solar array. The solar array is positioned to rotate about the Y axis of the satellite. A table of thruster attitudes, varying with time is provided from ground control to the onboard computer along with the calendar of relative sun position over the orbital profile. A solar array adjustment system is controlled to compensate on a continuous basis for the attitude gyrations required by thrust vector optimization. The solar array control operates to maintain the solar array in a perpendicular orientation to the sun vector for optimum power generation.

DESCRIPTION OF THE DRAWINGS

The invention is described in more detail below with reference to the attached drawing in which.

DESCRIPTION OF THE PREFERRED EMBODIMENT

Figure 1:
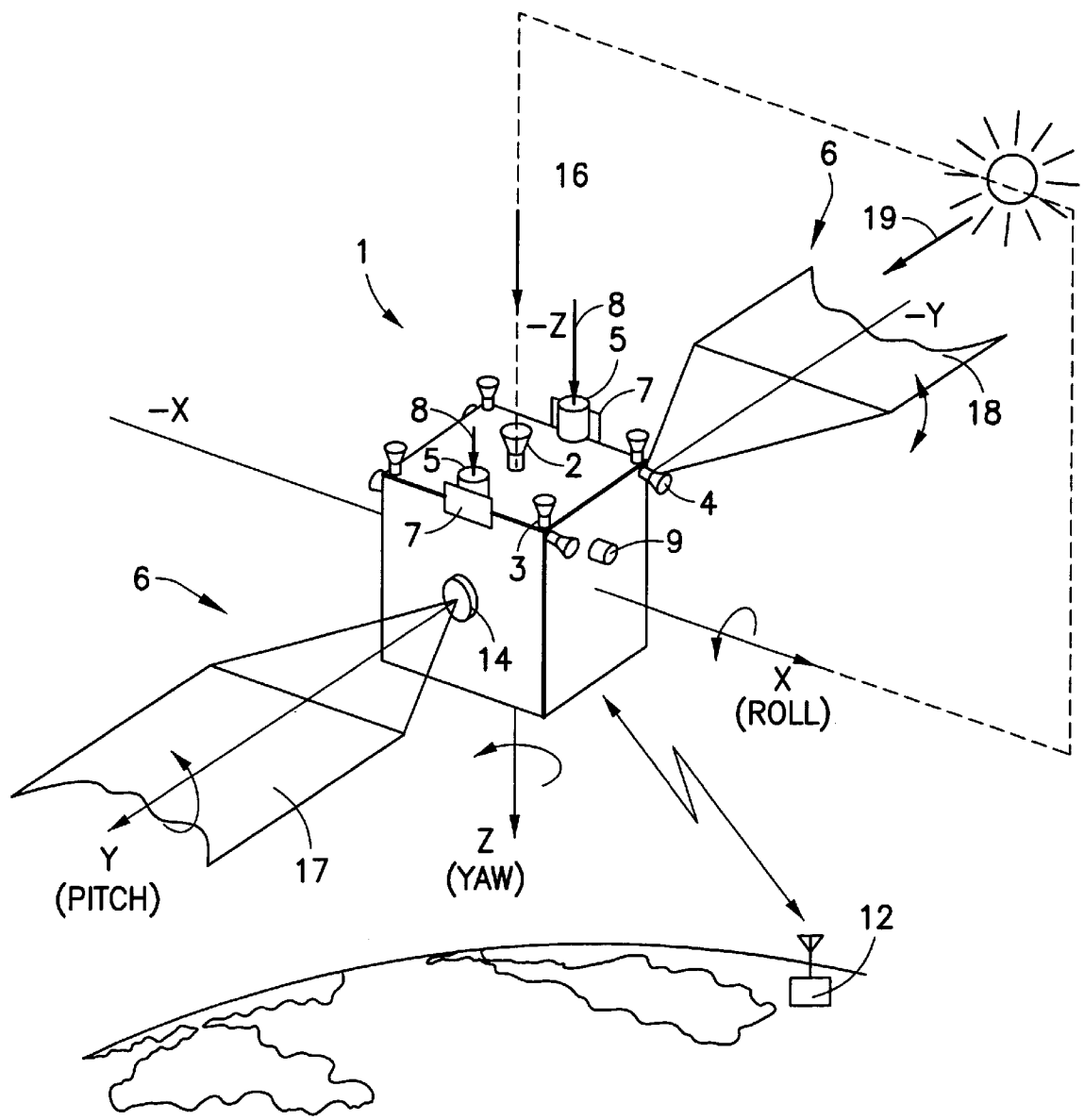
FIG. 1 is a schematic diagram of the satellite system of this invention.
Figure 2:
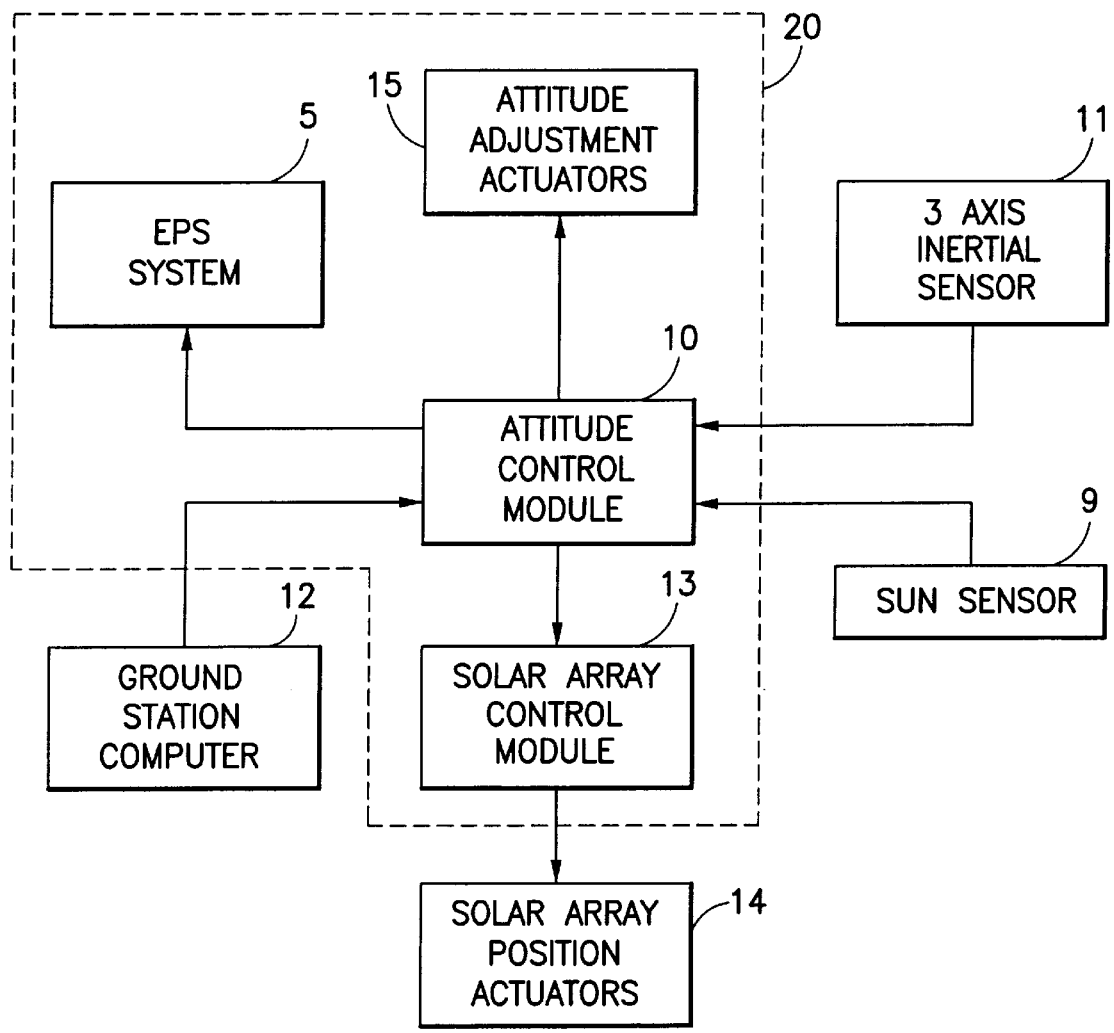
FIG. 2 is a block diagram of the satellite control system of this invention.

The satellite 1 is shown in FIG. 1 in simplified form. It is oriented in space with reference to the orthogonal pitch, roll, and yaw axis' x, y, and z respectively. Chemical thrusters 2–4 are mounted on the space craft for adjusting the position of the satellite with respect to its coordinates. Electrical propulsion (EPS) thrusters 5 are positioned with their thrust vectors 8 perpendicular to the axis of rotation of the associated solar array 6. The thrusters 5 are arranged to generate a resultant thrust vector 16 on the Z axis. The EPS thrust of thrusters 5 is generated by an EPS, for example a stationery plasma thruster, and power for the EPS is obtained through a solar array 6. Solar array 6 consists of solar panels 17 and 18 mounted on opposite sides of the satellite 1 for rotation about the y axis.

Each of the thrusters 5 is constructed with an associated thermal radiator 7, which is designed to radiate energy away from the thruster 5. To accomplish this purpose, thermal radiator 7 should be oriented towards space and away from the sun. To obtain reference data for attitude control, a sun sensor 9 is mounted on the satellite in the +x hemisphere, as shown in FIG. 1.

The attitude of satellite 1 is controlled by an attitude control module 10 which is part of the onboard computer system 20. A 3 axis inertial reference module 11 senses the attitude of the satellite on a continuous basis and reports to the attitude control module 10. Module 11 is generally a system of gyroscopes contained within the satellite 1. Inertial reference module 11 senses changes in satellite orientation from an initial position obtained from an assortment of reference data relative to earth, stars, and/or sun. This position may be updated by data from sun sensor 9, which provides a continuous reference within its field of view.

The attitude control module 10 receives current attitude data from inertial reference sensors 11 and compares it to the mission profile specified by ground controller 12. Attitude may be adjusted by a series of adjusters which may include chemical thrusters 2–4, EPS thrusters 5, and momentum wheels (not shown). Attitude control module 10 calculates attitude adjustments and actuates the appropriate mechanism to accomplish the adjustment.

Figure 4:
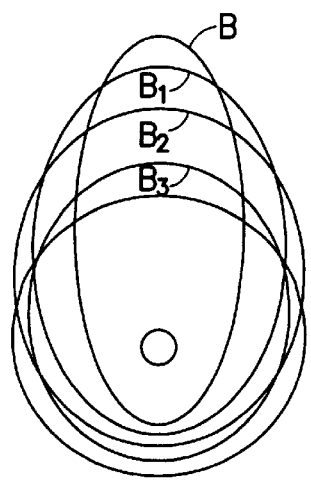
FIG. 4 is an illustration of the orbital transition.
Figure 3A:
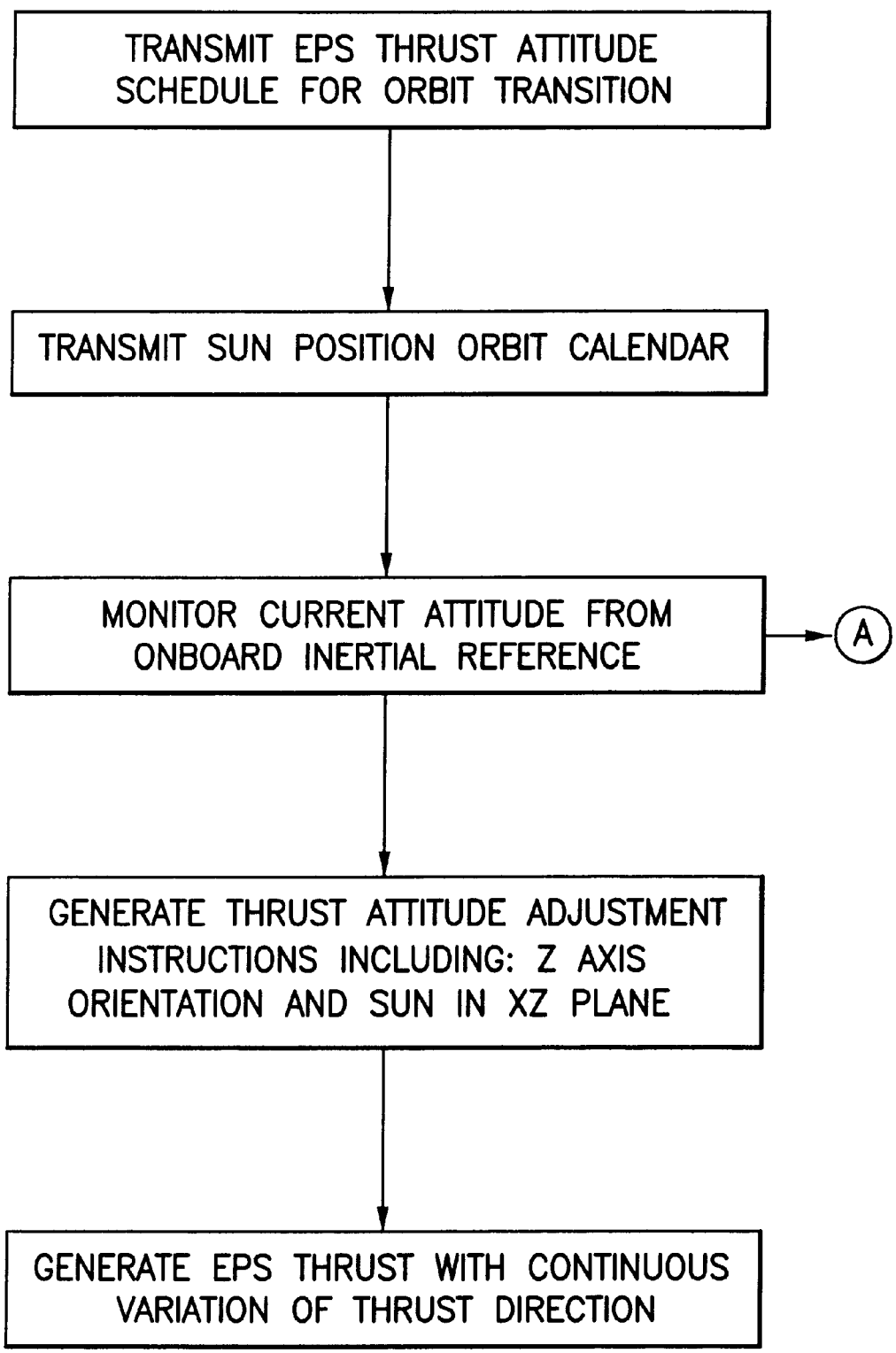
FIGS. 3a and 3b are flow diagrams of information in the system of this invention.
Figure 3B:
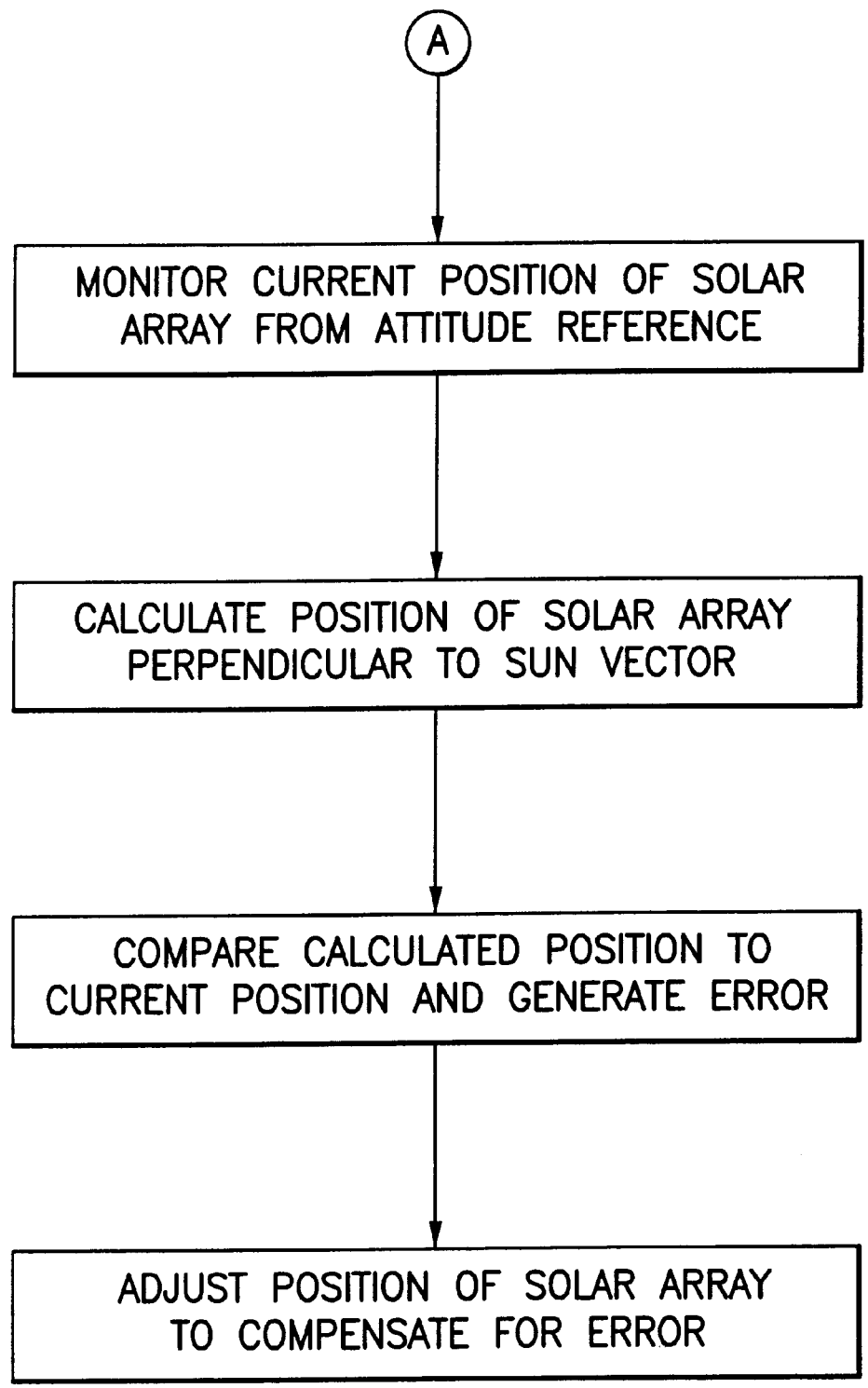

The specific mission with which this invention is concerned is to raise the satellite 1 from its insertion orbit A (not shown) to an operational orbit C. A typical transition is shown in the diagram of FIG. 4. To accomplish the transition, chemical thrusters 2–4 are fired to move the satellite into an intermediate orbit B and, using the EPS, satellite 1 is then moved to its operational orbit C. The transition is accomplished through a continuous orbital alteration illustrated in FIG. 4 by the orbits $B_1$, $B_2$, and $B_3$. A process of this type is discussed in more detail in the Spitzer, et al reference cited above and incorporated herein by reference. Other combinations of orbits may be adapted, for example instead of using the EPS to move to final orbit, it could be moved to a near final orbit and chemical thrusters used to finish the job.

The operational profile of the EPS is designed so that the magnitude of the thrust generated by the EPS be near constant and that the thrust attitude be continuously adjusted to optimize the direction of the thrust vector 8 for an efficient orbital transition as the satellite moves around each orbit. This will minimize loss in thrust direction efficiency caused by fixed thrust vector systems, such as that described in Spitzer, et al. It is understood that, for the purpose of this invention, it may be feasible to vary the EPS thrust magnitude. In addition it should be acknowledged that constant magnitude is a relative term and that under normal conditions the EPS operation will vary over a normal operational profile.

In order to accomplish this task, the attitude control 10 must process, a schedule of satellite attitudes which are calculated to maintain the direction of the thrust vector 8 in an optimum orientation, to cause the satellite to traverse a series of predetermined transition orbits. This transition regime requires a continuous adjustment of the attitude of the satellite 1, including solar array 6. This schedule or regime may be generated by the ground computer using known algorithms designed for this purpose. The schedule of attitudes is comprised of a timed series of maneuvers governed by the selected transition orbits. The schedule is generally derived from a series of firing directions through the orbits referenced in inertial space. In the preferred embodiment of this invention the onboard attitude control 11 receives the thrust attitude schedule and generates an error with reference to attitude sensed by the inertial reference system.

To accomplish the attitude adjustments, attitude control module 11 must compare the desired thrust direction attitude with the attitude sensed by the on board inertial system and generate an error signal. The error signal is converted to a series of adjustment instructions which are sent to the attitude actuators. Momentum wheels 15 are used for this purpose in the preferred embodiment of this invention. The adjustment instructions will include aligning the z axis for the thrust attitude and rotating the satellite through a yaw angle to align the xz plane with the sun vector 19. As illustrated, the latter motion will seek to put the sun vector 19 in the +x hemisphere to allow direct sensing by sun sensor 9 within its field of view. Because of the positioning of the EPS thruster 5, its radiator 7 will avoid direct sun in the adjusted attitude.

At this point, consideration is given to the orientation of the solar array 6 with respect to the sun. With the sun vector 19 in the xz plane, rotation of the array about its axis will compensate for the thrust attitude adjustment. This can be accomplished by the solar array control system 13 in conjunction with the array position actuators 14. In this manner four degrees of freedom are used to coordinate the thrust attitude with solar array orientation, namely, motion about the x,y, and z axis', plus array rotation about the y axis.

The panels 17 and 18 of solar array 6 are mounted for rotation on satellite 1 about an axis coincident with its y axis. Stepping motors or other actuators 14, actuated by signals from a solar array control module 13, move the array about its axis in relation to the sun. Because of the use of the EPS, it is necessary to maintain a maximum power availability during the orbit transition process. In order to accomplish this, the panels of solar array 6 must be oriented so that the plane of the array is perpendicular to the sun. It should be understood that perpendicular as used herein includes a range of near perpendicular orientation, for example an orientation of plus or minus 10 degrees to perpendicular will not appreciably effect power generation efficiency.

Solar array control module 13 of onboard computer 20 processes a calendar of the sun's position during the transition orbits and generates position data timed consistently with the satellite clock. From this information, the desired position of array 6 is obtained. Solar array control 13 also receives the current satellite position data as it moves through the transition orbits and obtains from this data the relative position of the array 6. By comparing the optimum position with the actual position, an error signal may be generated and the array repositioned accordingly. Although solar array orientation could be obtained from ground control, in the preferred of this invention, the solar array control derives this data from a sun calendar and an estimate of orbit position received from ground control.

During this process it is necessary that the operational elements, namely, EPS thrusters 5 and solar array 6, have a fixed relationship relative to each other and to the sun. As previously indicated, thrusters 5 are positioned such that their resultant thrust vector 16 is perpendicular to the axis of rotation of the array 6, preferably along the z axis, and said array axis is coincident with the y axis of the satellite 1.

As described above, the thrust attitude profile is converted by attitude control module 10 to generate a series of adjustment instructions designed to maintain the attitude of satellite 1 with the sun vector in the xz plane. With these constraints, the thruster vector 8 is continuously adjusted to its optimum direction through the transition orbits, while the solar array control 13 operates to rotate the solar array to compensate for the attitude adjustments. The array 6 is positioned perpendicular to the sun vector 19. Consistent with these constraints, the radiator 7 of the EPS thruster 5 will be continuously oriented away from the sun for maximum effect.

In this manner a combined attitude control and electric propulsion system is constructed to orient the EPS thrust vector for optimum efficiency and this is accomplished in coordination with the solar array control system to maintain consistent power generation and while maintaining EPS thruster radiator in an effective position. In addition a sun sensor remains aligned with the sun to provide continuing reference which can be used as a check for the onboard inertial reference. Since the signals for the thrust attitude maneuvers are generated onboard, reliance on ground control intervention is reduced.

We claim:

1. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further comprising:
- a system of electric propulsion thrusters mounted on the satellite for generating a resultant thrust in a predetermined direction;
- an onboard inertial reference for generating data indicative of the current attitude of the satellite;
- an onboard attitude control for processing said schedule of optimized thruster attitude data, said data relating to the transfer of the satellite through a series of transition orbits from said first orbit to said second orbit, said attitude control comparing the attitude indicated by the inertial reference to the thruster attitude data and generating an attitude adjustment for moving the satellite to the desired thruster attitude, said adjustment including a component which moves the satellite so that the sun position is aligned with the xz plane of said orthogonal axis';
- attitude actuators for adjusting the position of the satellite in accordance with the thruster attitude adjustment;
- a solar array mounted on the satellite for rotation about an axis coincident with the y axis of the satellite;
- a solar array control for generating array position data indicative of the rotational adjustment of the array required to align the array substantially perpendicular to the sun; and
- a solar array actuator connected to the array to drive the array in rotation about its axis in accordance with the array adjustment data from the solar array control.

2. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1 wherein the system of electric propulsion thrusters is mounted so that said predetermined direction is substantially perpendicular to said axis of rotation of said solar array.

3. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1 wherein the system of electric propulsion thrusters is mounted so that said predetermined direction is aligned with said z axis.

4. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further, as described in claim 1, wherein the inertial reference is a three axis system of cooperating gyroscopes.

5. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1 wherein said attitude adjustment includes a component which adjusts the position of the z axis in accordance with the desired thruster attitude.

6. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1 wherein the attitude actuators are operationally associated momentum wheels.

7. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further, as described in claim 1, further comprising a sun sensor mounted on the space craft for exposure to the sun, said sensor obtaining a reference therefrom, said reference providing data to check the settings of the inertial reference.

8. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1, further comprising a thermal radiator mounted on each of said electric propulsion thrusters to dissipate heat therefrom, wherein said radiator is positioned to avoid direct exposure to the sun during the transfer of the satellite to operational orbit.

9. A satellite control for an electric propulsion system, said propulsion system used for transferring a satellite from a first orbit to a second orbit in accordance with a predetermined schedule which includes continuous adjustment of the direction of electrical propulsion to maintain optimum electrical propulsion system efficiency, said satellite being oriented with reference to orthogonal x, y, and z axis, said control including a ground control computer and further as described in claim 1, wherein the attitude control module also processes a calendar of sun position data and said solar array control generates the array adjustment by processing said sun position data and said current attitude data.

10. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a first orbit to a second orbit comprising the steps of:

generating in said ground control computer a schedule of operating said propulsion system to transfer said satellite through a series of transition orbits from said first orbit to said second orbit, said schedule of operation including a fixed electric propulsion thrust magnitude with a continuous adjustment of the direction of said thrust to maintain optimum electrical propulsion system efficiency and transmitting said thrust attitude schedule to said on board attitude control;

generating a calendar of sun positions for the orbit transfer and transmitting said calendar to said on board attitude control;

sensing the current attitude through said onboard inertial reference and generating data relative thereto;

comparing the desired thrust attitude from said schedule to the current attitude data and generating an attitude adjustment required to move the satellite to the desired thrust attitude, said adjustment including a component which aligns the xz plane of said orthogonal axis' with the sun;

obtaining a current solar array orientation from said inertial reference data, comparing said current orientation with the orientation at the desired thrust attitude and generating an array orientation adjustment required to rotate the solar array about the y axis to position the array perpendicular to the position of the sun according to said calendar;

adjusting the attitude of the satellite in accordance with said attitude adjustment; and adjusting the orientation of the solar array in accordance with said array orientation adjustment.

11. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a transitional orbit to an operational orbit, as described in claim 9, further comprising the step of mounting the thruster of the electric propulsion system to exert a thrust in a direction perpendicular to the axis of rotation of the solar array.

12. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a transitional orbit to an operational orbit, as described in claim 9, further comprising the step of mounting the thruster of the electric propulsion system to exert a thrust in a direction parallel to the z axis.

13. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a transitional orbit to an operational orbit, as described in claim 9, wherein the step of sensing the current attitude is accomplished by a three axis system of cooperating gyroscopes.

14. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a transitional orbit to an operational orbit, as described in claim 9, wherein the step of generating an attitude adjustment further includes generating a components which adjusts the z axis to the position of the desired thrust attitude.

15. In a satellite control for an electric propulsion system, said satellite being oriented with reference to orthogonal x, y, and z axis, and said control including a ground control computer, an onboard attitude control, an onboard inertial reference, and a solar array operatively associated with a solar array control, said solar array mounted on the satellite for rotation about said y axis, a method of controlling the electric propulsion system for transferring said satellite from a transitional orbit to an operational orbit, as described in claim 9, further comprising the step of sensing the position of the sun and generating a position reference to reset the inertial reference.

* * * * *